(12) United States Patent
Sakashita et al.

(10) Patent No.: US 9,538,125 B2
(45) Date of Patent: *Jan. 3, 2017

(54) DISPLAY APPARATUS AND DRIVING METHOD THEREOF

(71) Applicant: CANON KABUSHIKI KAISHA, Tokyo (JP)

(72) Inventors: Yukihiko Sakashita, Kawasaki (JP); Ryosuke Mizuno, Tokyo (JP); Kiwamu Kobayashi, Yokohama (JP)

(73) Assignee: Canon Kabushiki Kaisha, Tokyo (JP)

( * ) Notice: Subject to any disclaimer, the term of this patent is extended or adjusted under 35 U.S.C. 154(b) by 412 days.

This patent is subject to a terminal disclaimer.

(21) Appl. No.: 13/670,656

(22) Filed: Nov. 7, 2012

(65) Prior Publication Data

US 2013/0063657 A1    Mar. 14, 2013

Related U.S. Application Data

(63) Continuation of application No. 12/475,926, filed on Jun. 1, 2009, now Pat. No. 8,330,856.

(30) Foreign Application Priority Data

Jun. 13, 2008   (JP) ................................. 2008-155883

(51) Int. Cl.
*H04N 7/16*    (2011.01)
*H04N 7/01*    (2006.01)
(Continued)

(52) U.S. Cl.
CPC .......... *H04N 7/0112* (2013.01); *G09G 3/3614* (2013.01); *H04N 7/0132* (2013.01);
(Continued)

(58) Field of Classification Search
CPC .......... H04N 5/14; H04N 5/144; H04N 7/014; H04N 7/0132; H04N 7/0112; H04N 7/01; H04N 13/0029; H04N 21/4402; H04N 7/0117; H04N 7/0125; H04N 7/0127; H04N 7/0135; H04N 7/0142; H04N 7/0145; H04N 7/0147; H04N 3/36; H04N 3/38; H04N 9/11; H04N 21/42676; H04N 21/4858; G06T 3/4007; G09G 5/00; G09G 3/2025; G09G 3/3614; H04L 67/2823
(Continued)

(56) References Cited

U.S. PATENT DOCUMENTS 6,056,408 A    5/2000  Kobayashi
6,650,311 B1   11/2003 Mori
(Continued)

FOREIGN PATENT DOCUMENTS

JP    11-133376 A      5/1999
JP    2004-264725 A    9/2004
(Continued)

OTHER PUBLICATIONS

Japanese Office Action dated Oct. 1, 2012, in corresponding Japanese Patent Application No. 2008-155883.
(Continued)

*Primary Examiner* — Ngoc Vu
(74) *Attorney, Agent, or Firm* — Fitzpatrick, Cella, Harper & Scinto

(57) ABSTRACT

A display apparatus and a driving method thereof capable of assuring reliability in frame inversion driving and improving cinema video image quality are provided. To accomplish this, a display apparatus of the embodiment replaces at least one of a plurality of frame images obtained by doubling the frame rate, with a different image before display. Specifically, the display apparatus replaces at least one of the double-speed converted plural frame images with a high-
(Continued)

frequency emphasized image and at least one with a low-frequency component image, and displays the frame images. Furthermore, the display apparatus replaces an image at the border between cinema images with a different image before displaying.

11 Claims, 8 Drawing Sheets

(51) Int. Cl.
    *G09G 3/36*     (2006.01)
    *G09G 5/393*     (2006.01)
    *G09G 5/395*     (2006.01)
    *G09G 5/397*     (2006.01)

(52) U.S. Cl.
    CPC ............. *G09G 5/393* (2013.01); *G09G 5/395* (2013.01); *G09G 5/397* (2013.01); *G09G 2320/0261* (2013.01); *G09G 2340/0435* (2013.01); *H04N 7/0105* (2013.01)

(58) Field of Classification Search
    USPC ........... 725/151; 348/97, 441, 459, 792, 793
    See application file for complete search history.

(56) References Cited

U.S. PATENT DOCUMENTS

| | | | |
|---|---|---|---|
| 6,719,427 B2 | 4/2004 | Sakashita et al. | |
| 7,542,619 B2 | 6/2009 | Toyooka et al. | |
| 7,817,127 B2 | 10/2010 | Take | |
| 7,844,128 B2 | 11/2010 | Toyooka et al. | |
| 8,077,258 B2 | 12/2011 | Take et al. | |
| 8,330,856 B2* | 12/2012 | Sakashita et al. | 348/441 |
| 2004/0125050 A1 | 7/2004 | Ohira et al. | |
| 2005/0273657 A1 | 12/2005 | Ichiki et al. | |
| 2006/0158411 A1 | 7/2006 | Sakashita | |
| 2006/0187342 A1 | 8/2006 | Soupliotis et al. | |
| 2006/0221069 A1 | 10/2006 | Sakashita | |
| 2007/0103418 A1 | 5/2007 | Ogino et al. | |
| 2007/0262974 A1* | 11/2007 | Take ................... | G09G 3/2025 345/204 |
| 2008/0170161 A1* | 7/2008 | Ogino ................. | G06T 3/4007 348/699 |
| 2009/0073192 A1 | 3/2009 | Kobayashi | |
| 2009/0256916 A1 | 10/2009 | Tanaka | |

FOREIGN PATENT DOCUMENTS

| | | |
|---|---|---|
| JP | 2004-274124 A | 9/2004 |
| JP | 2006-184896 A | 7/2006 |
| JP | 2007-046476 A | 2/2007 |
| JP | 2007-133051 A | 5/2007 |
| JP | 2007-304204 A | 11/2007 |
| JP | 2007-304205 A | 11/2007 |

OTHER PUBLICATIONS

Japanese Office Action dated Jul. 13, 2012, in corresponding Japanese Patent Application No. 2008-155883.

* cited by examiner

F I G. 2
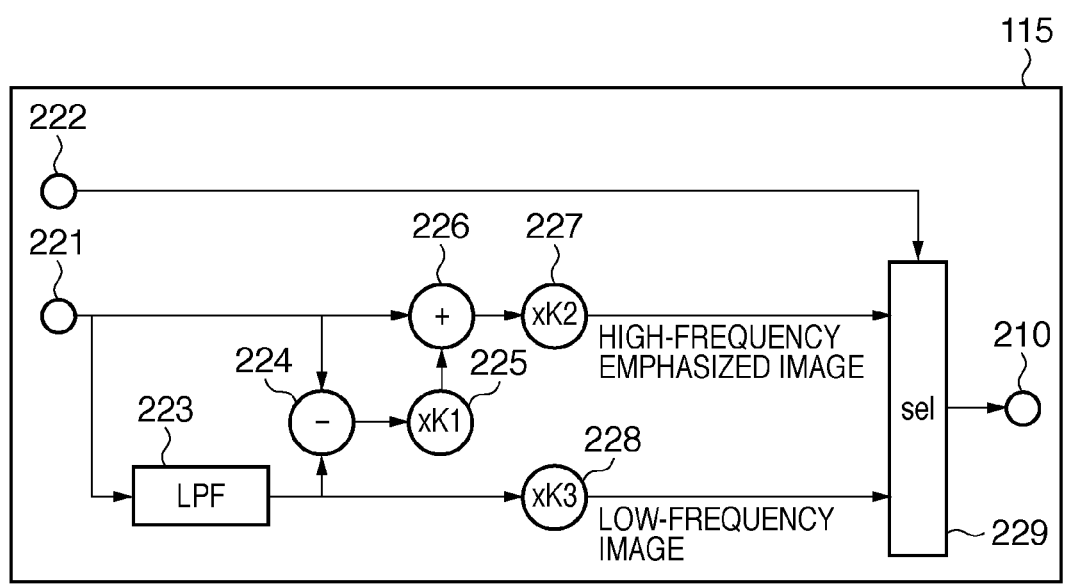

DISPLAY APPARATUS AND DRIVING METHOD THEREOF

This application is a continuation of application Ser. No. 12/475,926, filed on Jun. 1, 2009.

BACKGROUND OF THE INVENTION

Field of the Invention

The present invention relates to display apparatuses and, particularly, relates to display apparatuses of frame inversion (field inversion) driving schemes, and driving methods thereof.

Description of the Related Art

In a liquid-crystal display apparatus, burn-in occurs under application of a DC voltage; thus, it is necessary to apply an electrical field whose polarity is inverted between positive and negative on a field-by-field basis. Examples of a driving scheme in which the polarity of the applied electrical field is inverted on a field-by-field basis include the following:

(1) a scheme in which driving is performed with a uniform polarity for the entire display screen, and the polarity is inverted on a field-by-field basis;

(2) a scheme in which driving is performed by inverting the polarity on a line-by-line basis, and the polarity is inverted on a field-by-field basis; and (3) a scheme in which driving is performed by inverting the polarity on a pixel-by-pixel basis, and the polarity is inverted on a field-by-field basis.

An example of a liquid-crystal display apparatus that performs such field inversion drive is the liquid-crystal display apparatus disclosed in Japanese Patent Laid-Open No. 11-133376. Japanese Patent Laid-Open No. 11-133376 discloses a liquid-crystal display apparatus that enables flicker-free adjustment of the common electrode voltage by a method other than by increasing the driving speed. Specifically, such a liquid-crystal display apparatus switches between inverting the polarity of video signals input into the respective pixel electrodes on a field-by-field basis and inverting the polarity every n number of fields (n is a positive integer other than "1").

However, such a conventional technique has the following problems. For example, a liquid-crystal display apparatus that performs the above frame (field) inversion driving cannot achieve the display of high-quality cinema video and take measures to assure reliability of the liquid-crystal display apparatus. Also, when 24 Hz cinema video is telecine-converted to 60 Hz interlaced signals or progressive signals (2-3 pull down), the same image continues for two or three frames in the converted video, producing discontinuous motion.

SUMMARY OF THE INVENTION

The present invention enables realization of a display apparatus that improves the image quality of cinema video, while assuring reliability in a frame inversion drive, and a driving method thereof.

One aspect of the present invention provides a display apparatus, comprising: an input unit configured to input an image to be displayed; a determination unit configured to determine whether the input image is an image obtained by a 2-3 pull down method; an I/P conversion unit configured to, when the input image is an image obtained by the 2-3 pull down method, convert the input image from an interlaced image to a progressive image; a double speed frame unit configured to convert, when the input image is an image obtained by the 2-3 pull down method, frames of the progressive image converted by the I/P conversion unit; and a display unit configured to replace at least one of frame images converted by the double speed frame unit with a different image, and display the frame images while inverting the electrical polarity thereof on a frame-by-frame basis.

Another aspect of the present invention provides a method for driving a display apparatus, the method comprising: inputting an image to be displayed; converting each frame of the input image into a plurality of frame images; and replacing at least one of the plurality of frame images with a different image, and displaying the frame images while inverting the electrical polarity thereof on a frame-by-frame basis.

Further features of the present invention will become apparent from the following description of exemplary embodiments (with reference to the attached drawings).

BRIEF DESCRIPTION OF THE DRAWINGS

FIG. 2 is a circuit diagram illustrating the operation of a motion correction processing unit 115 according to the first embodiment.

DESCRIPTION OF THE EMBODIMENTS

Embodiments of the present invention will now be described in detail with reference to the drawings. It should be noted that the relative arrangement of the components, the numerical expressions and numerical values set forth in these embodiments do not limit the scope of the present invention unless it is specifically stated otherwise.

First Embodiment

Figure 1:
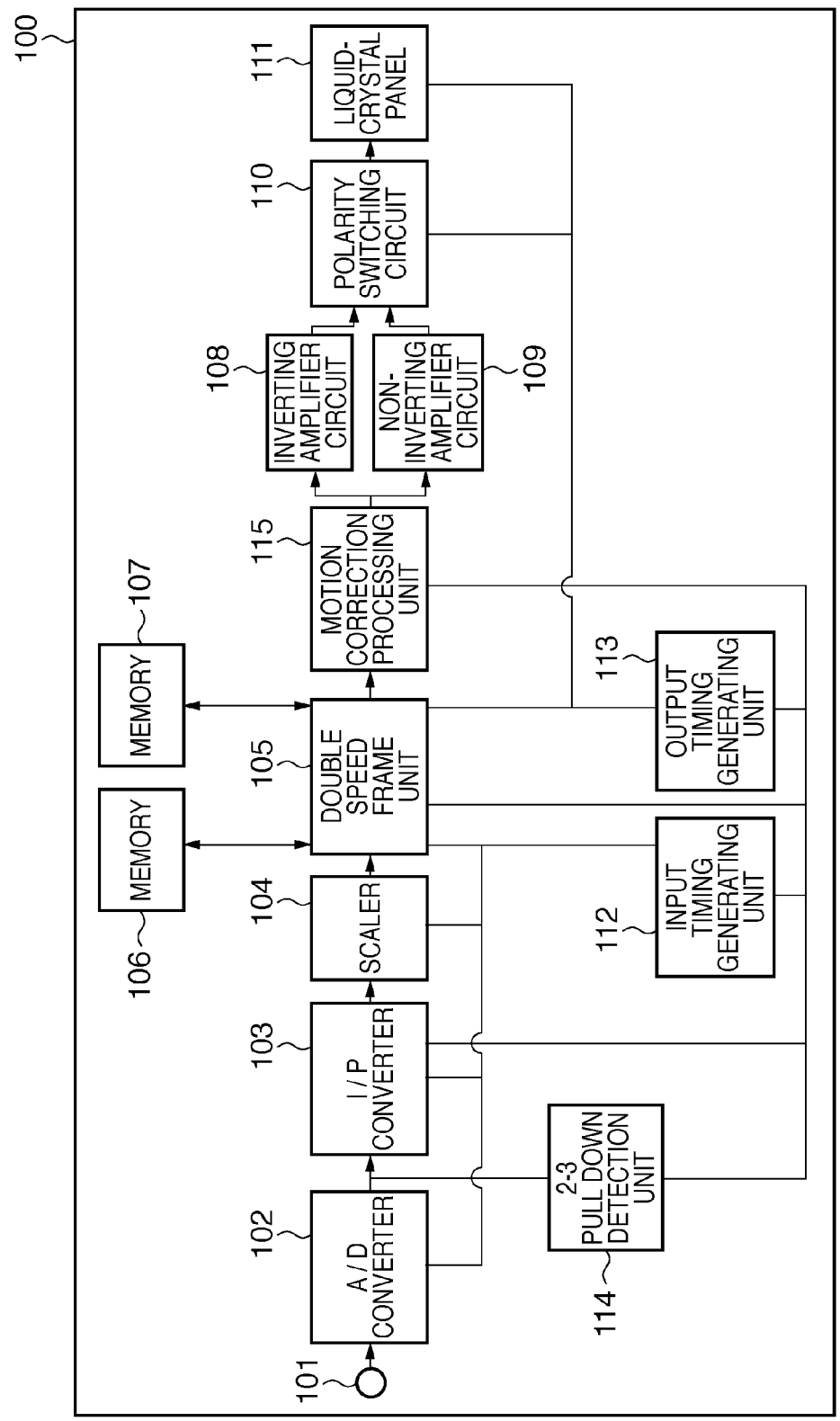
FIG. 1 is a block diagram showing an exemplary configuration of a liquid-crystal display apparatus according to a first embodiment.

A first embodiment will be described below with reference to FIG. 1 to FIG. 3. FIG. 1 is a block diagram showing an exemplary configuration of a liquid-crystal display apparatus according to the first embodiment. Blocks relating to the present invention will be mainly described herein. Therefore, the configuration of a liquid-crystal display apparatus of the present invention may include other blocks. In the following description, a liquid-crystal display apparatus is used as an example of the display apparatus.

A liquid-crystal display apparatus 100 includes a video input terminal 101, an A/D converter 102, an I/P converter 103, a scaler 104, a double speed frame unit 105, memories 106 and 107, an inverting amplifier circuit 108, a non-inverting amplifier circuit 109, a polarity switching circuit 110, a liquid-crystal panel 111, an input timing generating unit 112, an output timing generating unit 113, a 2-3 pull down detection unit 114 and a motion correction processing unit 115.

The video input terminal 101 receives an original cinema image as input to be displayed in the liquid-crystal panel 111, for example. The image (image signals) input through the video input terminal 101 is input into the A/D converter 102 and undergoes A/D conversion. The A/D-converted image signals are input into the I/P converter 103 so as to be converted from an interlaced signal to a progressive signal. Here, "interlaced" refers to first performing display with every other scanning line in the liquid-crystal panel 111 from top to bottom, and thereafter performing display with the remaining scanning lines from top to bottom. That is, "interlaced" refers to a display method in which a screen of a single frame is displayed through two repetitions of a drawing operation. Additionally, "progressive" means a so-called non-interlaced state, and refers to a display method in which a screen of a single frame is displayed through one repetition of a drawing operation.

The scaler 104 performs a resolution conversion process such as magnification/reduction so that the resolution of the I/P-converted image signals matches that of the liquid-crystal panel 111. The double speed frame unit 105 converts one frame in the input image (screen) into a plurality of frames. For example, the double speed frame unit 105 doubles the frame rate in the image signals output from the scaler 104. The resultant image signals are written into the memories 106 and 107.

The motion correction processing unit 115 replaces at least one of a plurality of frame images with a different image. Also, in the present embodiment, the motion correction processing unit 115 classifies image signals output from the double speed frame unit 105 into image signals in which a high-frequency component is emphasized and image signals composed of a low-frequency component, and outputs the classified signals to the inverting amplifier circuit 108 and the non-inverting amplifier circuit 109. The inverting amplifier circuit 108 and the non-inverting amplifier circuit 109 amplify the input image signals to the signal level suited to drive the liquid-crystal panel 111. The polarity switching circuit 110 switches the electrical polarity of the image signals output from the inverting amplifier circuit 108 and the non-inverting amplifier circuit 109 so as to alternate between positive polarity and negative polarity, and outputs the image signals to the liquid-crystal panel 111.

The 2-3 pull down detection unit 114 detects the periodical pattern of a static field in an image signal, determines whether that image signal corresponds to a telecine-converted image, and outputs the detection result information. The input timing generating unit 112 outputs, as shown in FIG. 1, information for inputting image signals to the blocks connected via the signal line. Each of the blocks receives image signals in accordance with this information. In contrast, the output timing generating unit 113 outputs information for outputting image signals from each of the blocks.

Next, the motion correction processing unit 115 will be described in detail with reference to FIG. 2. FIG. 2 is a circuit diagram illustrating the operation of the motion correction processing unit 115 according to the first embodiment. The motion correction processing unit 115 classifies the image signals output from the double speed frame unit 105 into those images in which a high-frequency component is emphasized and those images composed of a low-frequency component, and outputs these images alternately.

The motion correction processing unit 115 includes input terminals 221 and 222, a low-pass filter 223, a subtracter 224, multipliers 225, 227 and 228, an adder 226, a selector 229 and an output terminal 210. The input terminal 221 receives as input an image (video) signal output from the double speed frame unit 105. Also, the input terminal 222 receives as input a selection signal for switching between an image in which a high-frequency component is emphasized and an image composed of a low-frequency component and outputting the selected images. This selection signal is output by, for example, the output timing generating unit 113.

The image (video) signal output from the double speed frame unit 105 is input via the input terminal 221, and a low-frequency image is extracted as a result of the high-frequency component being removed with the use of the low-pass filter 223. The low-frequency image is multiplied by a predetermined coefficient K3 in the multiplier 228, and is output through switching by the selector 229.

In addition, the image signal input from the input terminal 221 is input into the subtracter 224, and the output signal from the low-pass filter 223 is subtracted. As a result, the motion correction processing unit 115 extracts a high-frequency component image. Furthermore, the high-frequency component image is multiplied by a predetermined coefficient K1 in the multiplier 225, and in the adder 226 the original image input from the input terminal 221 is added to the resultant image. In this manner, the motion correction processing unit 115 acquires a high-frequency emphasized image obtained by adding the high-frequency component image to the original image. Thereafter, the high-frequency emphasized image is multiplied by a predetermined coefficient K2 in the multiplier 227, and is output via the selector 229.

In the present embodiment, a processing method will be described which is employed in a case where a video is input whose signals have been converted by telecine conversion (2-3 pull down) to 60 Hz interlaced signals such as an NTSC signal. The driving process of double speed frame inversion and the motion improvement drive performed on a telecine image will be described with reference to FIG. 3.

Figure 3:
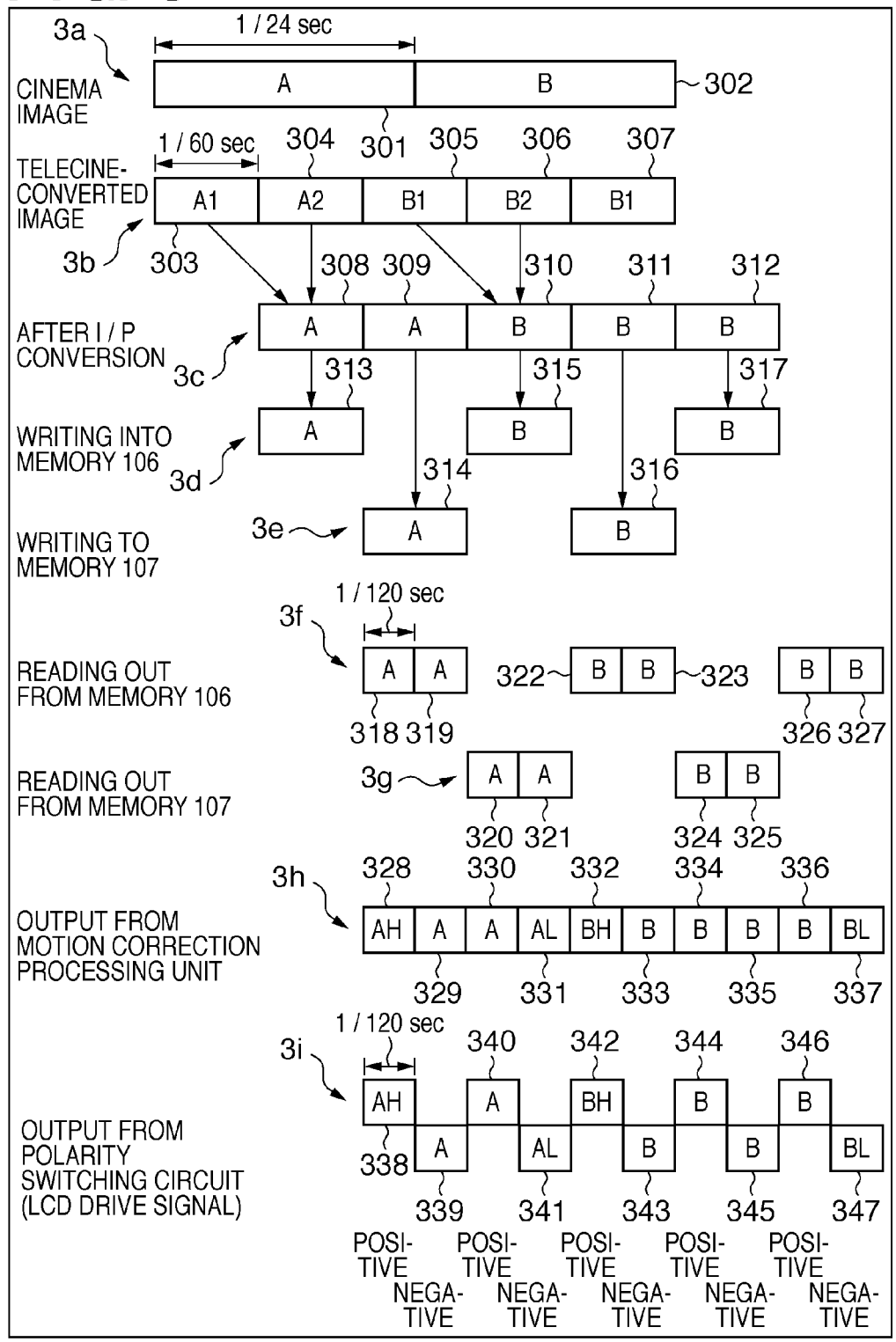
FIG. 3 illustrates a processing flow of a driving process of double speed frame inversion and a motion improvement drive according to the first embodiment.

FIG. 3 illustrates the processing flow of a driving process of double speed frame inversion and a motion improvement drive according to the first embodiment. Here, a case will be described as an example in which the driving process of double speed frame inversion and the motion improvement drive are performed on 60 Hz interlaced telecine image signals.

Herein, reference numeral 3a indicates original cinema images. Reference numeral 3b indicates telecine-converted signals input from the video input terminal 101. 3c indicates I/P-converted image signals output from the I/P converter 103. 3d indicates writing into the memory 106 by the double speed frame unit 105. 3e indicates writing into the memory 107 by the double speed frame unit 105. 3f indicates reading from the memory 106 by the double speed frame unit 105. 3g indicates reading from the memory 107 by the double speed frame unit 105. 3h indicates output from the motion correction processing unit 115. 3i indicates output from the polarity switching circuit 110, which serves as the drive signal for the liquid-crystal panel 111. Also, 301 and 302 indicate cinema images. 303 to 307 indicate interlaced images. 308 to 312 indicate progressive images. 313 to 317 indicate progressive images written into the memory 106 or the memory 107.

As shown with 3a, the image signal of the original cinema video is composed of 24 frame images per second, and the image is updated at 24 Hz. In the case where cinema video is telecine-converted into 60 Hz interlaced signals such as an NTSC signal, a method called 2-3 pull down is used. The 2-3 pull down method converts the frame rate from 24 Hz to 60 Hz by alternately repeating a single image of the cinema video two times and repeating three times, as shown with 3b. Furthermore, it is possible to acquire telecine-converted interlaced signals by reading signals alternately from even-numbered lines and odd-numbered lines for each 60 Hz frame.

The above-described telecine-converted interlaced signals are input into the A/D converter 102 through the video input terminal 101. The A/D converter 102 performs A/D conversion on the input image signals and then input the image signals to the I/P converter 103. Herein, as shown in FIG. 1, the 2-3 pull down detection unit 114 detects telecine-converted 60 Hz interlaced signals obtained by 2-3 pull down.

In an image (film image) converted by 2-3 pull down, a static field appears every five fields. The 2-3 pull down detection unit 114 detects this periodic pattern and determines if an image is a film image (telecine-converted image) or a general image, and outputs the detection result information. For example, with 3b, the images 305 and 307, which are generated based on the cinema image 302, are the same image, and therefore the 2-3 pull down detection unit 114 determines the presence of the static field and detects the 2-3 pull down phase.

Based on the phase detected by the 2-3 pull down detection unit 114, as shown with 3c, the progressive images 308 and 309 are generated from the interlaced images 303 and 304 in the I/P converter 103. Also, the progressive images 310, 311 and 312 are generated from the interlaced images 305 and 306.

IP-converted image signals are input into the scaler 104, where a resolution conversion process is performed in which the image is magnified/reduced so that the resolution of the input image matches the resolution for display in the liquid-crystal panel 111. The image signals output from the scaler 104 are input into the double speed frame unit 105, where the frame rate thereof is doubled.

IP-converted progressive images 308 to 312 are, through the scaler 104, written into the memory 106 and the memory 107 alternately by the double speed frame unit 105 as shown with 3d and 3e. Note that 3d and 3e show the timing for the double speed frame unit 105 to write images into the memory 106 and the memory 107. Data pieces are alternately written into the memory 106 and the memory 107 on a frame-by-frame basis. 3f and 3g show the timing for the double speed frame unit 105 to read data pieces from the memory 106 and the memory 107.

As shown with 3f and 3g, the double speed frame unit 105 reads out data written into the memory 106 twice at a frame rate double that at the time of writing, so as to output the same image twice in succession. Thereafter, the double speed frame unit 105 reads out data written into the memory 107 twice in succession. In this manner, by reading out data from the memories at double speed and reading out images for two frames during a period corresponding to that for writing one frame, it is possible to double the frame rate of the input image.

Images 318 to 327 obtained by the double speed frame unit 105 doubling the frame rate are input into the motion correction processing unit 115. The motion correction processing unit 115, as shown with 3h, converts images 328 and 332, which are the initial frame images after a cinema image is switched to another, into images in which a high-frequency component is emphasized, and converts the images 331 and 337, which are the last frame images of the successive five frames, into images composed of a low-frequency component only.

The images 328 to 337 output from the motion correction processing unit 115 are input into the inverting amplifier circuit 108 and the non-inverting amplifier circuit 109, and after being amplified to a signal level suited to drive the liquid-crystal panel 111, are input into the polarity switching circuit 110. As shown with 3i, the polarity of the respective signals of the images whose frame rate has been doubled are switched so as to alternate between positive and negative relative to the common electrode voltage of the liquid-crystal panel, and the signals are output. In this manner, by alternately outputting images having a positive and negative polarity, flicker-free display can be achieved.

As described above, the display apparatus according to the present embodiment replaces at least one of a plurality of frame images whose frame rate has been doubled with a different image, before displaying them. Specifically, the display apparatus according to the present embodiment replaces at least one of a plurality of frame images whose frame rate has been doubled with a high-frequency emphasized image and at least one of the frame images with a low-frequency component image. Furthermore, the display apparatus according to the present embodiment displays an image for which a motion correction process has been performed on the images at the border between cinema images. It is thereby possible to achieve a display apparatus that can improve motion blur. Also setting the display refresh rate to 120 Hz with respect to the input at 60 Hz enables flickers to be made undetectable to the eye even during frame inversion driving in which the drive polarity is inverted on a frame-by-frame basis, thereby enabling flicker-free high image quality display. In this manner, the present embodiment can provide a display apparatus that achieves both countermeasures for burn-in, flickers or the like caused by the frame inversion drive and high image quality display of cinema video. Also, while examples of the scheme for driving frames by inverting the drive polarity on a frame-by-frame basis include the following, the present embodiment can be applied to all of them; (1) a scheme in which driving is performed with a uniform polarity for the entire display screen, and the polarity is inverted on a frame-by-frame basis; (2) a scheme in which driving is performed by inverting the polarity on a line-by-line basis, and the polarity is inverted on a frame-by-frame basis; and (3) a scheme in which driving is performed by inverting the polarity on a pixel-by-pixel basis, and the polarity is inverted on a frame-by-frame basis.

Second Embodiment

Next, a second embodiment will be described with reference to FIG. 4. In the present embodiment, a liquid-crystal display apparatus that performs double speed frame processing, capable of improving the motion in telecine images, thereby achieving high image quality display, and improving the polarization of a DC component during AC driving will be described.

In the first embodiment, while motion blur due to the image holding properties of cinema video is improved, 2-3 patterns undergo double speed frame processing as is, and therefore discontinuous motion picture remains, which is generated by the repetition of patterns made up of different numbers of images. In other words, sets of two images or three images, the two or three images being generated from a single cinema image, undergo double speed frame processing as is. Accordingly, after the double speed frame processing, as shown with 3h in FIG. 3, sets of four images and six images are alternately repeated. For this reason, there may be a case in which a viewer feels the motion in images which display a continuous motion to be unnatural, and image quality is reduced. In the present embodiment, a method of improving such reductions in the image quality due to discontinuous motion will be described.

Figure 4:
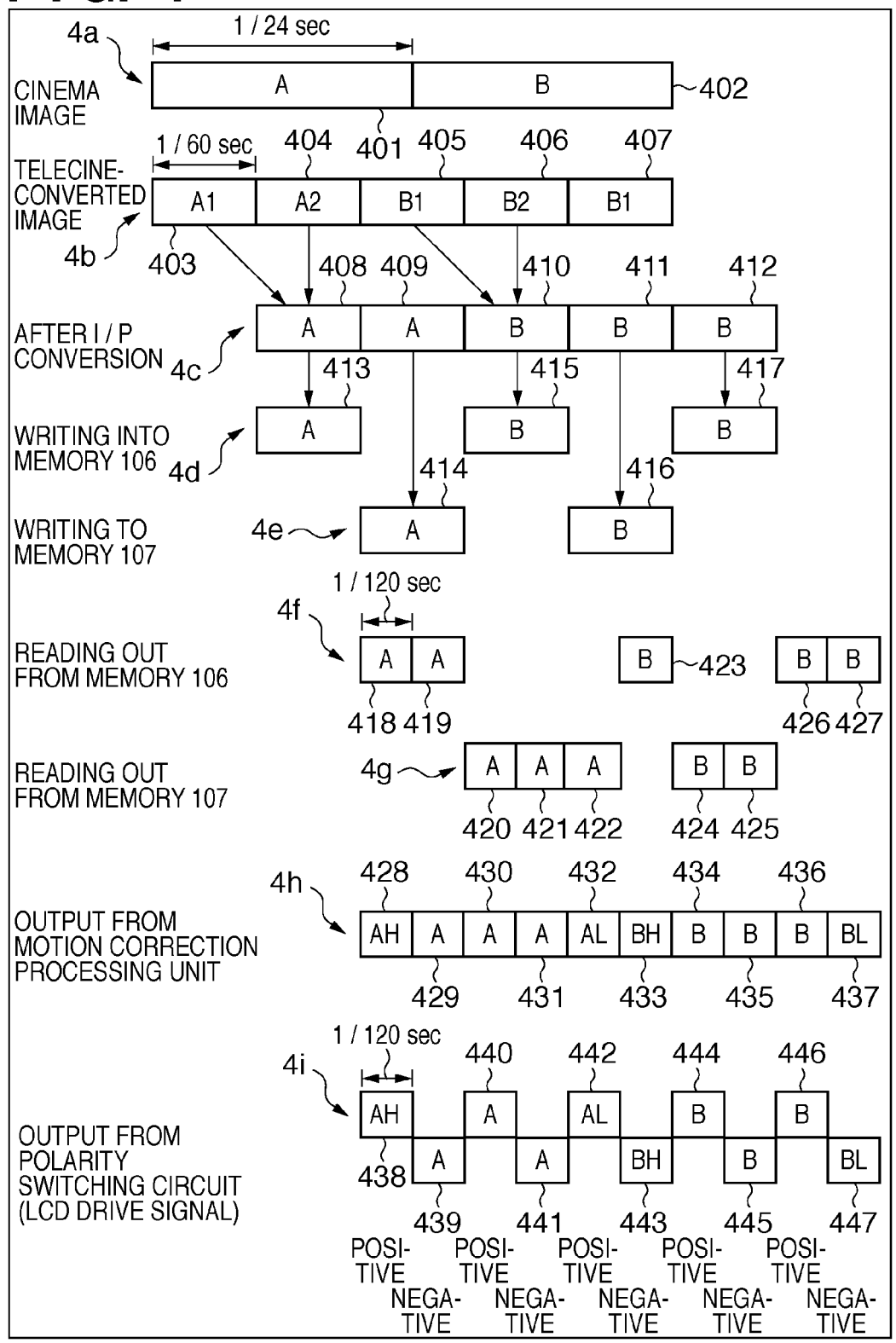
FIG. 4 illustrates a processing flow of a driving process of double speed frame inversion and a motion improvement drive according to a second embodiment.

FIG. 4 illustrates a processing flow of the driving process of double speed frame inversion and the motion improvement drive according to a second embodiment. Herein, a processing flow for a telecine image is described for the case in which the 2-3 pull down detection unit 114 has determined that an image is a telecine image and has detected the phase of the 2-3 pull down. Note that in the following description, portions different from FIG. 3 will be mainly described.

Here, 4a indicates original cinema images. 4b indicates telecine-converted signals input from the video input terminal 101. 4c indicates I/P-converted image signals output from the I/P converter 103. 4d indicates writing into the memory 106 by the double speed frame unit 105. 4e indicates writing into the memory 107 by the double speed frame unit 105. 4f indicates reading from the memory 106 by the double speed frame unit 105. 4g indicates reading from the memory 107 by the double speed frame unit 105. 4h indicates output from the motion correction processing unit 115. 4i indicates output from the polarity switching circuit 110, which serves as a drive signal for the liquid-crystal panel 111. Also, 401 and 402 indicate cinema images. 403 to 407 indicate interlaced images. 408 to 412 indicate progressive images. 413 to 417 indicate progressive images written into the memory 106 or the memory 107.

According to the present embodiment, in the case where the 2-3 pull down detection unit 114 determines an image as a telecine image, the double speed frame unit 105 reads out data from the memories 106 and 107 as shown with 4f and 4g. Specifically, an image A is read out for two frames (418 and 419) from the memory 106, and thereafter the image A is read out successively for three frames (420, 421 and 422) from the memory 107. By shifting the timing for reading out data from the memory 106 by one frame, an image B is read out for one frame (423) from the memory 106, and the image B is read out for two frames (424 and 425) from the memory 107. After that, the image B is read out from for two frames (426 and 427) from the memory 106.

By reading out data as described above, the image A (418 to 422) and image B (423 to 427) are respectively arranged into five frames. This enables a succession of images in the same number of frames, so high quality video with smooth motion can be obtained. The images whose frame rate has been doubled by the double speed frame unit 105 are input into the motion correction processing unit 115.

The motion correction processing unit 115, as shown with 4h, converts frame images 428 and 433, which are the initial frame images after a cinema image switches to another, into images in which a high-frequency component is emphasized, and converts the frame images 432 and 437, which are the last frame images of the successive five frames, into images composed of a low-frequency component only.

As shown with 4i, of the successive five frames of images 438 to 442, the image 438 in which a high-frequency component is emphasized and the image 442 composed of a low-frequency component are driven on the positive polarity side. Conversely, of the successive five frames of images 443 to 447, the image 443 in which a high-frequency component is emphasized and the image 447 composed of a low-frequency component are driven on the negative polarity side. As a result, the polarity to drive the images that have been converted by the motion correction processing unit 115 is inversed every successive five frames, so the polarization of DC components is canceled, thereby improving reductions in reliability such as burn-in.

In the present embodiment, a case is described in which NTSC interlaced signals are input. However, a similar process can be applied for the case in which progressive signals are input, simply by removing the I/P conversion process. In such a case, the I/P-converted signals in FIG. 3 and FIG. 4 shall be progressive signals.

Also, although a case is described in which analog signals are input in the present embodiment, the invention can be applied to the case in which digital signals such as DVI are input as well. Also, although the case described in the present embodiment uses two memories, there is no limitation to this, and it is possible to use one memory, dividing the storage area thereof.

Third Embodiment

The third embodiment will be described next with reference to FIG. 5 and FIG. 6. In the present embodiment, a case is described in which a black inserting process is used as a motion correction process. The black inserting process refers to processing in which an image of a uniform tone (a black image, for example) is inserted into the frames whose frame rate has been doubled.

Figure 5:
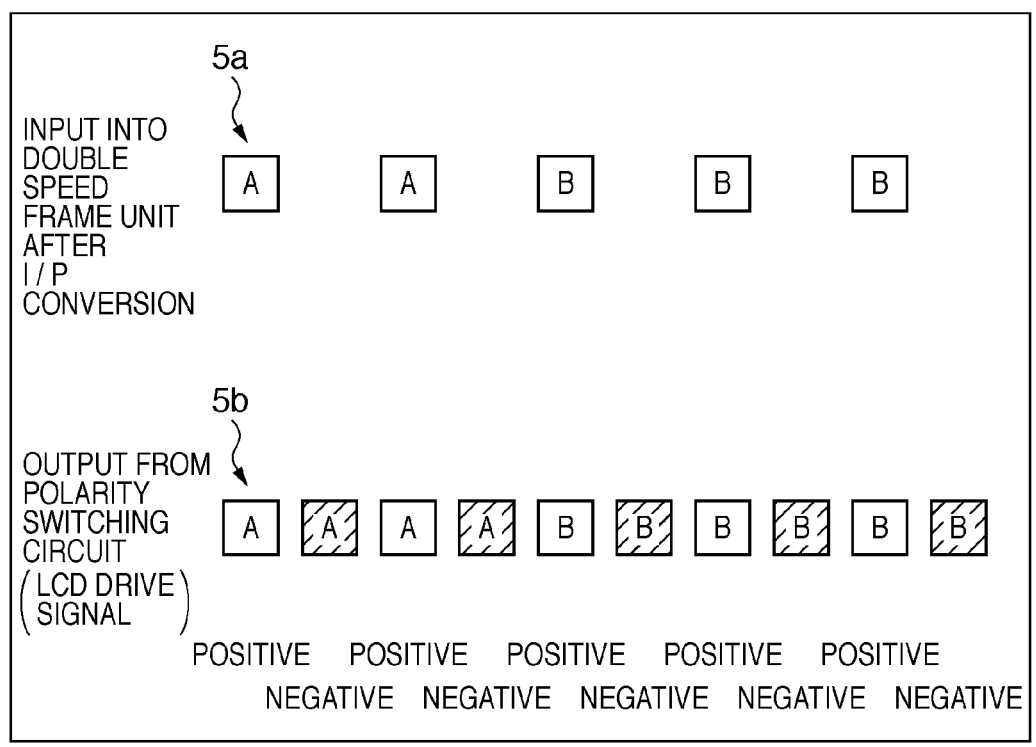
FIG. 5 illustrates a black inserting process as a comparative example.

FIG. 5 illustrates a black inserting process as a comparative example. Reference numeral 5a indicates images read out from the memories 106 and 107 by the double speed frame unit 105. Reference numeral 5b indicates output from the polarity switching circuit.

As shown in FIG. 5, in a comparative example, the black image is inserted on the latter of the frames obtained by doubling the frame rate. In this case, a black image is inserted only on the negative polarity side, and therefore the DC component is polarized on the negative polarity side, thereby causing a reduction in reliability such as burn-in.

Figure 6:
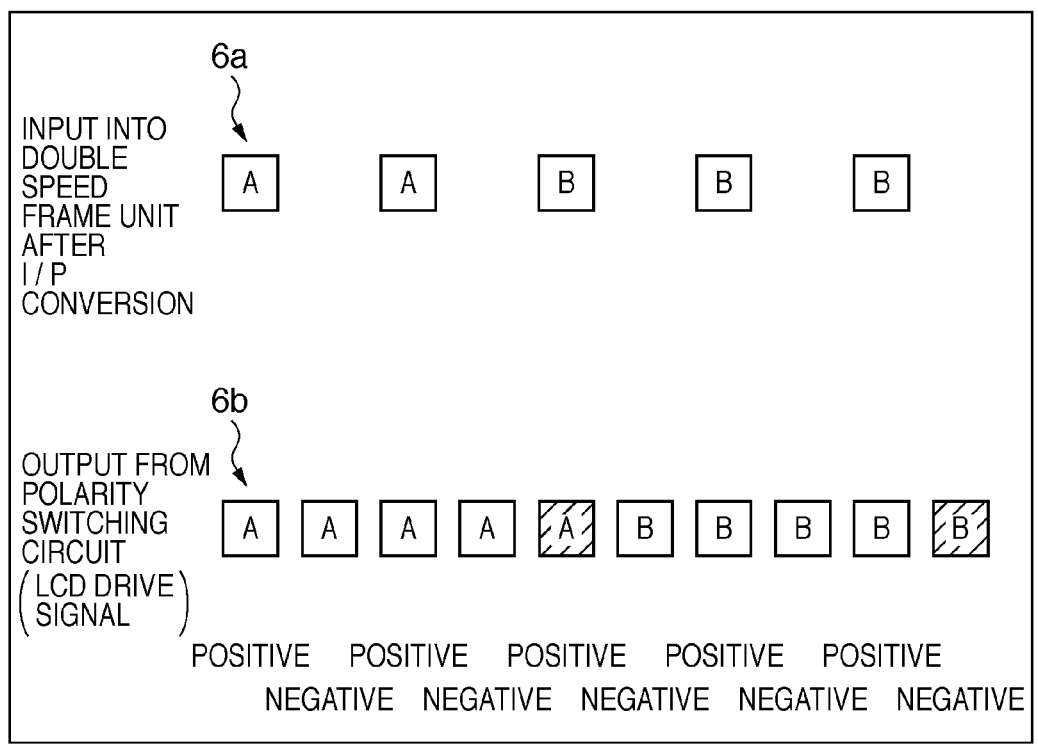
FIG. 6 illustrates a black inserting process according to a third embodiment.

FIG. 6 illustrates a black inserting process according to a third embodiment. Reference numeral 6a indicates images read out from the memories 106 and 107 by the double speed frame unit 105. Reference numeral 6b indicates output from the polarity switching circuit.

As shown in FIG. 6, in the present embodiment, the 2-3 pattern of the input signals is converted into a 5-5 pattern after the frame rate is doubled, and the black inserting process is performed at the border between the 5-5 patterns. Accordingly, the polarity of the frame on which the black inserting process is performed is inverted every successive five frames, so the polarization of DC components is improved. At the same time, since images are switched every successive five frames, a reduction in the image quality due to discontinuous motion picture display will not occur.

Fourth Embodiment

Next, the fourth embodiment shall be described with reference to FIG. 7 and FIG. 8. In the present embodiment, a case is described as an example, in which at least one of frame images is replaced with an image processed by overdrive as a motion correction process.

Figure 7:
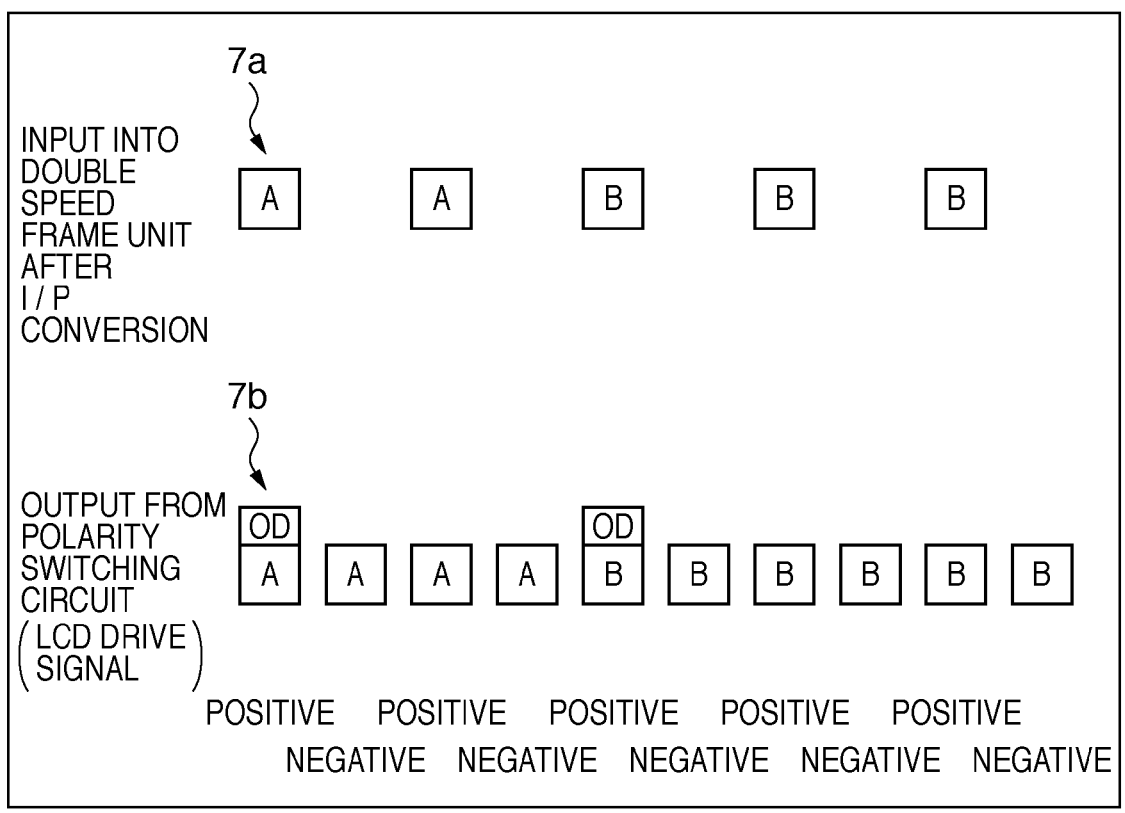
FIG. 7 illustrates a process called overdrive as a comparative example.

FIG. 7 illustrates the process called overdrive as a comparative example. Reference numeral 7a indicates images read out from the memories 106 and 107 by the double speed frame unit 105. Reference numeral 7b indicates output from the polarity switching circuit.

In the comparative example, overdrive is performed on a frame of 4-6 pattern video obtained by doubling the frame rate, the images being switched at that frame. In this case, since overdrive is performed only on the positive polarity side, the DC components are polarized, causing a reduction in reliability such as burn-in.

Figure 8:
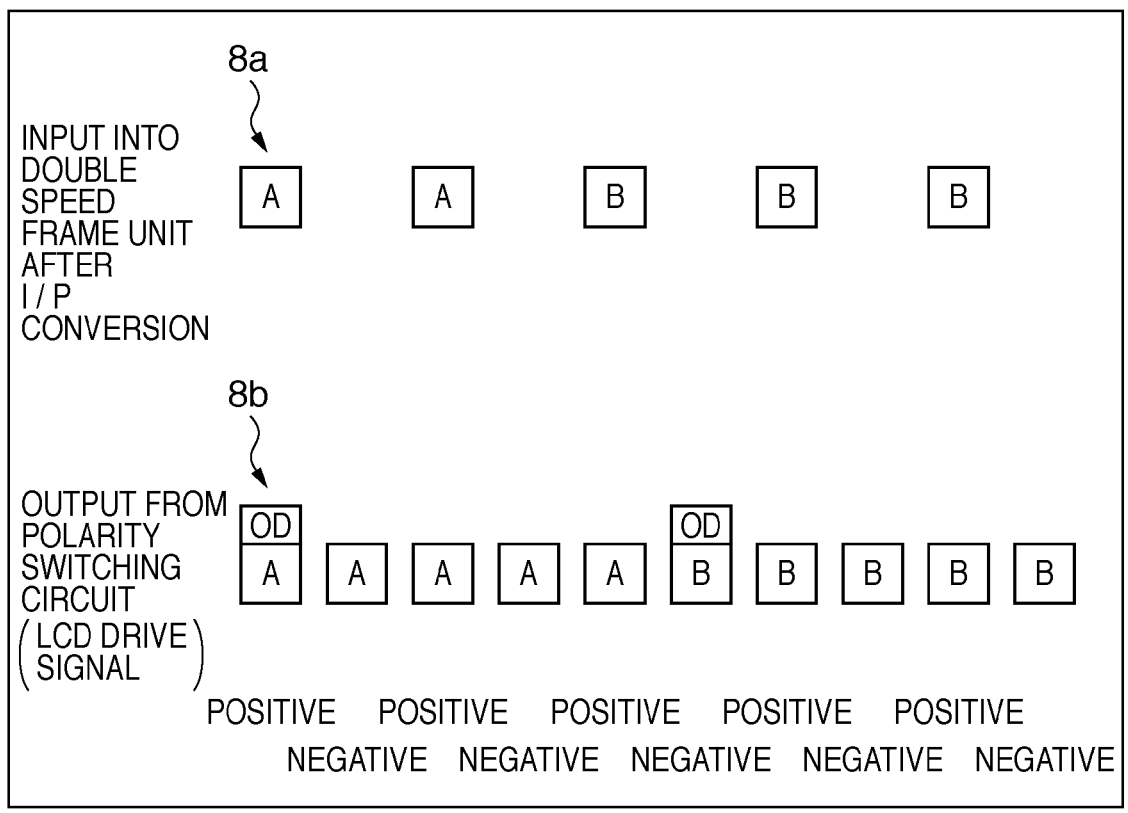
FIG. 8 illustrates a process called overdrive according to a fourth embodiment.

FIG. 8 illustrates the process called overdrive according to the fourth embodiment. Reference numeral 8a indicates images read out from the memories 106 and 107 by the double speed frame unit 105. Reference numeral 8b indicates output by the polarity switching circuit.

In the present embodiment, the input signals of the 2-3 pattern are converted into the 5-5 pattern after doubling the frame rate, and overdrive is performed at the border between the 5-5 patterns. Accordingly, the polarity of the frame on which overdrive is performed is inverted every five frames, so the polarization of DC components is improved. At the same time, since images are switched every successive five images, reductions in the image quality due to discontinuous motion picture display will not occur.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2008-155883 filed on Jun. 13, 2008, which is hereby incorporated by reference herein in its entirety.

What is claimed is:

1. A display control apparatus comprising:
an input unit configured to input images:
a determining unit configured to determine whether the input images are obtained by performing a 2-3 pull down processing on cinema images;
an obtaining unit configured to obtain images having a higher frame rate than the input images based on predetermined processing on the input images;
a specifying unit configured to specify, from among a first plurality of images obtained by the obtaining unit based on a first cinema image, (a) a first image used to generate a first low-frequency component image and (b) a second image used to generate a first high-frequency component image, and to specify, from among a second plurality of images obtained by the obtaining unit based on a second cinema image which is next to the first cinema image, (a) a third image used to generate a second low-frequency component image and (b) a fourth image used to generate a second high-frequency component image, in a case where the determining unit has determined that the input images are obtained by performing the 2-3 pull down processing on the cinema images, wherein a number of the first plurality of images and a number of the second plurality of images are different from each other;
a first generation unit configured to generate the first low-frequency component image using the first image specified by the specifying unit and to generate the second low-frequency component image using the third image specified by the specifying unit;
a second generation unit configured to generate the first high-frequency component image using the second image specified by the specifying unit and to generate the second high-frequency component image using the fourth image specified by the specifying unit; and
a display control unit configured to control a display unit to display a plurality of images including the first and second low-frequency component images generated by the first generation unit and the first and second high-frequency component images generated by the second generation unit.

2. The display control apparatus according to claim 1, further comprising a frame rate improvement unit configured to improve a frame rate of images obtained based on predetermined processing on the input images,
wherein the first generation unit generates a low-frequency component image from at least one of the images of which the frame rate is improved by the frame rate improvement unit, and the second generation unit generates a high-frequency component image based on at least one of the images of which the frame rate is improved by the frame rate improvement unit.

3. The display control apparatus according to claim 1, wherein the display control unit controls the display unit to invert an electrical polarity of the display unit on a frame-by-frame basis.

4. The display control apparatus according to claim 1, wherein the input unit inputs an odd number of images corresponding to one cinema image, and the first generation unit generates the first and second low-frequency component images and the second generation unit generates the first and second high-frequency component images based on the obtained images, and
wherein the display control unit controls the display unit such that the first and second high-frequency component images are displayed preceding display of the first and second low-frequency component images.

5. The display control apparatus according to claim 1, wherein the first generation unit generates the first and second low-frequency component images based on low-pass filter processing on the at least one of the obtained images, and
wherein the second generation unit generates the first and second high-frequency component images based on a difference between the at least one of the obtained images and the generated low-frequency component image frame.

6. The display control apparatus according to claim 1, wherein a frame rate corresponding to the input images is 60 frames per second and a frame rate corresponding to the cinema images is 24 frames per second.

7. The display control apparatus according to claim 1, wherein a first distance between the first low-frequency component image and the first high-frequency component image which correspond to the first cinema image and a second distance between the second low-frequency component image and the second high-frequency component image which correspond to the second cinema image are different from each other.

8. A display control method comprising:
inputting images;
determining whether the input images are obtained by performing 2-3 pull down processing on cinema images;
obtaining images having a higher frame rate than the input images based on predetermined processing on the input image frames;
in a case where it has determined that the input images are obtained by performing the 2-3 pull down processing on the cinema images, specifying, from among a first plurality of obtained images based on a first cinema image, (a) a first image used to generate a first low-frequency component image and (b) a second image used to generate a first high-frequency component image, and specifying, from among a second plurality of obtained images based on a second cinema image which is next to the first cinema image, (a) a third image used to generate a second low-frequency component image and (b) a fourth image used to generate a second high-frequency component image, wherein a number of the first plurality of images and a number of the second plurality of images are different from each other;

generating the first low-frequency component image using the specified first image and generating the second low-frequency component image using the specified third image;

generating the first high-frequency component image using the specified second image and generating the second high-frequency component image using the specified fourth image;

controlling a display unit to display a plurality of images including the generated first and second low-frequency component images and the generated first and second high-frequency component images.

9. The display control method according to claim 8, further comprising improving a frame rate of images obtained based on predetermined processing on the input images,
wherein a low-frequency component image is generated in the generating step from at least one of the images of which the frame rate is improved, and a high-frequency component image is generated in the generating step based on at least one of images of which the frame rate is improved.

10. The display control method according to claim 8, wherein the first and second low-frequency component images are generated in the generating step based on low-pass filter processing on the at least one of the obtained images, and
wherein the first and second high-frequency component images are generated in the generating step based on a difference between the at least one of the obtained images and the generated low-frequency component image.

11. The display control method according to claim 8, wherein a frame rate corresponding to the input images is 60 frames per second and a frame rate corresponding to the cinema images is 24 frames per second.

* * * * *